(12) United States Patent
Yan et al.

(10) Patent No.: US 12,452,806 B2
(45) Date of Patent: Oct. 21, 2025

(54) NON ANCHOR CARRIER SYNCHRONIZATION SIGNAL

(71) Applicant: Lenovo (Beijing) Limited, Beijing (CN)

(72) Inventors: Zhi Yan, Xicheng District (CN); Haipeng Lei, Haidian District (CN); Yingying Li, Haidian District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 820 days.

(21) Appl. No.: 17/640,588

(22) PCT Filed: Sep. 20, 2019

(86) PCT No.: PCT/CN2019/106929
§ 371 (c)(1),
(2) Date: Mar. 4, 2022

(87) PCT Pub. No.: WO2021/051379
PCT Pub. Date: Mar. 25, 2021

(65) Prior Publication Data
US 2022/0400452 A1    Dec. 15, 2022

(51) Int. Cl.
*H04J 11/00* (2006.01)
*H04J 13/00* (2011.01)
*H04W 56/00* (2009.01)

(52) U.S. Cl.
CPC ....... *H04W 56/001* (2013.01); *H04J 11/0069* (2013.01); *H04J 13/0062* (2013.01)

(58) Field of Classification Search
None
See application file for complete search history.

(56) References Cited

U.S. PATENT DOCUMENTS

| | | | |
|---|---|---|---|
| 2019/0150151 A1* | 5/2019 | Nader | H04W 4/70 370/329 |
| 2019/0174270 A1* | 6/2019 | Shan | H04W 4/70 |
| 2019/0191396 A1* | 6/2019 | Sun | H04W 52/146 |
| 2021/0111824 A1* | 4/2021 | Park | H04J 11/0076 |
| 2021/0320824 A9* | 10/2021 | Ghosh | H04L 25/0226 |
| 2021/0321346 A1* | 10/2021 | Yang | H04W 68/00 |

FOREIGN PATENT DOCUMENTS

| | | |
|---|---|---|
| EP | 3605886 A1 | 3/2018 |
| EP | 3457779 A1 | 3/2019 |
| WO | 2017167839 A1 | 10/2017 |
| WO | 2017167885 A1 | 10/2017 |

(Continued)

OTHER PUBLICATIONS

"Liu et al., A Signal Transmission Method, Device and System, Jan. 3, 2017, CN 108270710" (Year: 2017).*

(Continued)

*Primary Examiner* — Wing F Chan
(74) *Attorney, Agent, or Firm* — FIG. 1 Patents (57) ABSTRACT

Methods and apparatuses for transmitting synchronization signal in non-anchor carrier are disclosed. A method comprises transmitting a carrier configuration on an anchor carrier; and transmitting a synchronization signal in a non-anchor carrier based on the carrier configuration.

20 Claims, 11 Drawing Sheets

(56) References Cited

FOREIGN PATENT DOCUMENTS

| WO | 2018174600 A1 | 9/2018 |
| WO | 2019063819 A1 | 4/2019 |
| WO | 2019148486 A1 | 8/2019 |

OTHER PUBLICATIONS

"Ng et al., Methods and Apparatus for Discovery Signals for LTE Advanced, May 11, 2016, CN 105580297" (Year: 2014).*
"International Preliminary Report on Patentability", PCT Application No. PCT/CN2019/106929, Mar. 31, 2022, 6 pages.
"International Search Report and Written Opinion", PCT Application No. PCT/CN2019/106929, Jun. 22, 2020, 7 pages.
Ericsson , "Summary of email discussion on Multi-PRB configuration", 3GPP TSG-RAN WG2 #94, R2-164034, Nanjing, China, May 2016, 13 pages.
Zte , et al., "Discussion on system acquisition time reduction for NB-IoT", 3GPP TSG RAN WG1 Meeting #88bis, R1-1705488, Spokane, WA, USA [retrieved May 6, 2022]. Retrieved from the Internet <https://www.3gpp.org/ftp/tsg_ran/WG1_RL1/TSGR1_88b/Docs?sortby=daterev>., Apr. 2017, 3 pages.
19945772.2 , "Extended European Search Report", EP Application No. 19945772.2, May 8, 2023, 11 pages.
Ericsson , "UE Reconfiguration to a Non-Anchor Carrier in NB-IoT", 3GPP TSG-RAN WG2 #93bis, R2-162769, Dubrovnik, Croatia [retrieved Jun. 5, 2023]. Retrieved from the Internet <https://www.3gpp.org/ftp/tsg_ran/wg2_r12/TSGR2_93bis/Docs/>., Apr. 2016, 7 Pages.

* cited by examiner

NON ANCHOR CARRIER SYNCHRONIZATION SIGNAL

FIELD

The subject matter disclosed herein generally relates to wireless communications, and more particularly relates to non-anchor carrier synchronization signal.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Reference Signal (RS), Single Carrier Frequency Division Multiple Access (SC-FDMA), Time-Division Duplex (TDD), Time Division Multiplex (TDM), User Entity/Equipment (Mobile Terminal) (UE), Universal Mobile Telecommunications System (UMTS), Worldwide Interoperability for Microwave Access (WiMAX), Internet-of-Things (IoT), Narrowband Internet-of-Things (NB-IoT or NBIoT), Long Term Evolution (LTE), Narrowband (NB), Narrowband Primary Synchronization Signal (NPSS), Narrowband Secondary Synchronization Signal (NSSS), Narrowband Physical Broadcast Channel (NPBCH or NB-PBCH), System Information (SI), System Information Block (SIB), System Information Block Type1-NB (NB-SIB1), Physical Downlink Shared Channel (PDSCH), Physical Uplink Shared Channel (PUSCH), Physical Resource Block (PRB), Universal Mobile Telecommunications System (UMTS), Evolved-UMTS Terrestrial Radio Access (E-UTRA or EUTRA), non-anchor carrier synchronization signal (NSS), enhanced machine type of communication (eMTC), resynchronization signal (RSS), bandwidth limited/coverage enhancement (BL/CE).

In NB-IoT, an anchor carrier is a carrier carrying at least synchronization signal and broadcast signal. The anchor carrier of NBIoT is a carrier where the UE assumes that Narrowband Primary Synchronization Signal (NPSS), Narrowband Secondary Synchronization Signal (NSSS) and Narrowband Physical Broadcast Channel (NPBCH) are transmitted, in which NPSS and NSSS are synchronization signals and NPBCH contains broadcast signals. On the other hand, a non-anchor carrier is a carrier where the UE does not assume that NPSS, NSSS and NPBCH are transmitted.

In Rel. 17 NBIoT, non-anchor carriers can be configured to be used for PDSCH and PUSCH transmission. Therefore, it is desirable that an additional synchronization signal (non-anchor carrier synchronization signal, referred to as NSS hereinafter) is transmitted in a non-anchor carrier. The non-anchor carrier synchronization signal (NSS) can be used for non-anchor carrier measurement, channel estimation, synchronization and system information tracking.

BRIEF SUMMARY

Methods and apparatuses for transmitting synchronization signal in non-anchor carrier are disclosed.

In one embodiment, a method comprises transmitting a carrier configuration on an anchor carrier; and transmitting a synchronization signal in a non-anchor carrier based on the carrier configuration.

In one embodiment, the non-anchor carrier is associated with a carrier index, and the carrier index is included in the carrier configuration or derived by the frequency position. The synchronization signal may be associated with a virtual ID that is configured in the carrier configuration or determined by the cell ID of the anchor carrier. A timing offset of synchronization signal in the non-anchor carrier is preferably configured in the carrier configuration.

In another embodiment, the non-anchor carrier is in a E-UTRA system. A ID offset of the virtual ID of synchronization signal to E-UTRA system cell ID may be included in the carrier configuration. The virtual ID divided by 6 may be equal to the E-UTRA system cell ID divided by 6 plus or minus the ID offset. When the non-anchor carrier is in a E-UTRA system, E-UTRA system cell ID is included in the carrier configuration.

In some embodiment, the synchronization signal is transmitted in a first number of time units. In each time unit, the synchronization signal may comprised of a random sequence with a length of L. The length of L is determined by an operation mode of the non-anchor carrier. The initialization seed of the random sequence is determined by at least one of the carrier index, the virtual ID, cell ID of the anchor carrier, and a system information change indicator. The system information change indicator may be determined by a higher layer parameter systemInfoValueTag of NBIoT. In particular, the system information change indicator is equal to 1 when the systemInfoValueTag of NBIoT in time unit synchronization signal transmission time unit is different from systemInfoValueTag of NBIoT of pervious T time units. The T is configured in carrier configuration or equal to SI validation time. The synchronization signal may be mapped to time-frequency resources of each time unit. The mapping method may be determined by an operation mode of the non-anchor carrier. The mapping method may be one of symbol S to the last symbol of time unit and then symbol 0 to symbol S−1, symbol S to the last symbol of the time unit, and symbol 0 to the last symbol of the time unit. S is determined by higher layer or fixed to 3.

In some embodiment, in each time unit, the synchronization signal is comprised of a Zadoff-chu sequence, and a system information change indicator is included in the generation of the sequence. The system information change indicator is included in the root index of Zadoff-chu sequence of the synchronization signal. Alternatively, the synchronization signal is further comprised of a cover code, and the system information change indicator is included in the cover code.

In one embodiment, a base unit comprises a transmitter, and the transmitter is configured to transmit a carrier configuration on an anchor carrier; and transmit a synchronization signal in a non-anchor carrier based on the carrier configuration.

In another embodiment, a method comprises receiving a carrier configuration on an anchor carrier; and receiving a synchronization signal in a non-anchor carrier based on the carrier configuration.

In yet another embodiment, a remote unit comprises a receiver, and the receiver is configured to receive a carrier configuration on an anchor carrier; and receive a synchronization signal in a non-anchor carrier based on the carrier configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In the first embodiment, when NBIoT and eMTC are both supported for network, eMTC RSS (resynchronization signal) may be reused as NSS (non-anchor carrier synchronization signal) of NBIoT.

Figure 1:
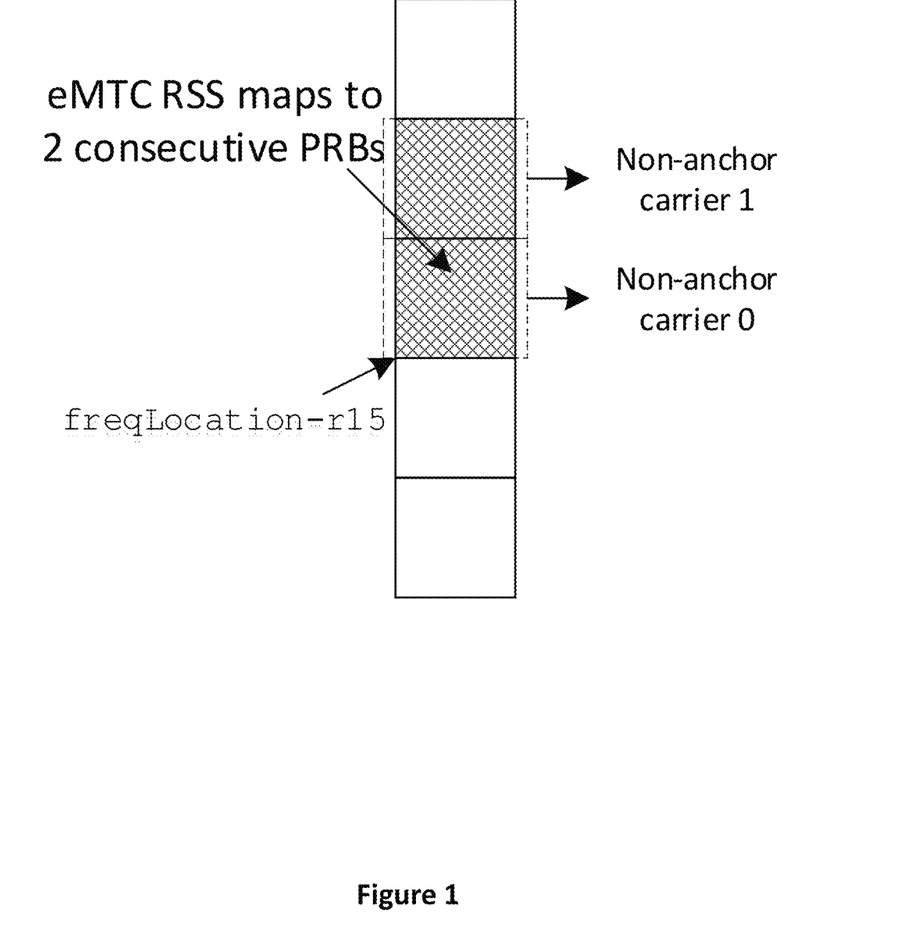
FIG. 1 is a schematic diagram illustrating eMTC RSS.

As shown in FIG. 1, for eMTC, RSS is transmitted in two consecutive PRBs starting from the PRB number configured by higher layers, e.g. indicated by a parameter freqLocation in RRC configuration.

In NBIoT, a non-anchor carrier occupies one PRB in frequency domain. A carrier configuration is transmitted from the eNB to the UE on an anchor carrier to configure non-anchor carrier(s) associated with the anchor carrier, including at least the frequency position of the non-anchor carrier. If a non-anchor carrier is configured to be at the PRB where RSS of eMTC is transmitted, RSS may be reused as NSS of the non-anchor carrier. As shown in FIG. 1, suppose non-anchor carrier 0 is transmitted in the first of the two consecutive PRBs where RSS is transmitted while non-anchor carrier 1 is transmitted in the second of the two consecutive PRBs where RSS is transmitted, both the non-anchor carrier 0 and the non-anchor carrier 1 may use the RSS (or precisely, part of the RSS) as the NSS. For NBIoT, the frequency position of eMTC RSS should be included in the non-anchor carrier configuration.

In time domain, the RSS is transmitted in $N_{RSS}$ consecutive BL/CE DL subframes, starting from the first BL/CE DL subframe in a radio frame satisfying $$\left(n_f \bmod \frac{P_{RSS}}{10}\right) = O_{RSS},$$

in which the RSS periodicity $P_{RSS}$ and the RSS time offset $O_{RSS}$ are configured by higher layers, e.g. indicated by a parameter periodicity and a parameter timeOffset, which should be included in NBIoT RSS configuration when reusing the eMTC RSS for NBIoT, and the RSS duration $N_{RSS}$ is also configured by higher layers, e.g. indicated by a parameter duration, which should be included in NBIoT RSS configuration.

The sequence $d_i(n)$ used for the ith RSS subframe is generated according to Equation 1:

$$d_i(n) = \frac{1-2c(2n)}{\sqrt{2}} + jb(i)\frac{1-2c(2n+1)}{\sqrt{2}}, n=0, 1, \ldots, 263$$

In Equation 1, c(n) is a pseudo-random sequence. The pseudo-random sequence generator is initialized with $c_{init}$=virtual ID+$2^9$u. In the condition that the eMTC RSS is reused as NSS, the NSS is associated with a virtual ID. The virtual ID can be the LTE cell ID (E-UTRA system cell ID). The range of LTE cell ID is {0, . . . , 503}. Alternatively, when the virtual ID is equal to the NBIoT cell ID while the NBIoT cell ID is different from the LTE cell ID, a cell ID offset indicating the offset of the NBIoT cell ID (virtual ID) from the LTE cell ID shall be configured. The LTE cell ID (E-UTRA system cell ID) or the cell ID offset may be indicated by a parameter CellIDOffset included in NBIoT RSS configuration. In particular, because NBIoT cell ID % 6=LTE cell ID %6, NBIoT cell ID/6=LTE cell ID/6+cell ID offset or NBIoT cell ID/6=LTE cell ID/6−cell ID offset is satisfied. In this condition, the range of the cell ID offset is {−83, . . . , 83}. In eMTC, u equals the value of the higher-layer parameter systemInfoUnchanged-BR as set in subframe i=0. The parameter systemInfoUnchanged-BR indicates whether system information is changed or not for eMTC. If the eNB schedules that the NBIoT and the eMTC change the system information (SIB or SI) simultaneously, the parameter systemInfoUnchanged-BR may be used as the value of u.

In Equation 1, b(i) is given by the following Table 1.

TABLE 1

| $N_{RSS}$ | Definition of b(i) b(0), b(1), . . . , b($N_{RSS}$ − 1) |
|---|---|
| 8 | [ 1, 1, −1, 1, −1, −1, 1, 1] |
| 16 | [ 1, 1, −1, −1, 1, −1, 1, 1, 1, −1, −1, 1, 1, −1, 1, −1] |
| 32 | [−1, −1, 1, 1, −1, 1, 1, −1, 1, −1, −1, −1, 1, 1, 1, −1, −1, −1, 1, −1, 1, −1, 1, 1, −1, 1, 1, 1, −1, −1, 1, −1] |
| 40 | [1, −1, −1, 1, −1, −1, 1, 1, 1, −1, 1, −1, 1, 1, −1, −1, −1, 1, −1, −1, −1, 1, 1, 1, −1, −1, −1, 1, −1, 1, 1, −1, −1, 1, −1, 1, −1, −1, 1] |

Figure 2:
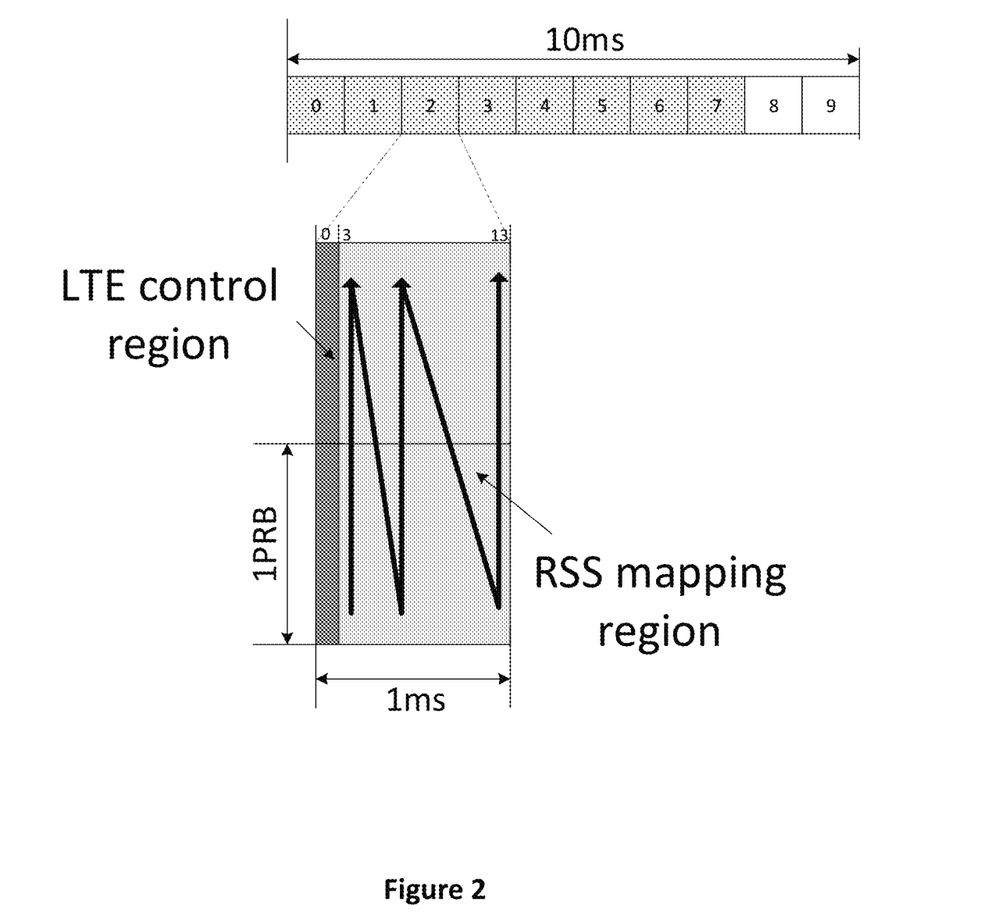
FIG. 2 is a schematic diagram illustrating mapping of RSS.

In each subframe i used for RSS transmission, the RSS sequence $d_i(n)$ shall be mapped to resource elements in sequence, starting with $d_i(0)$ in increasing order. As shown in FIG. 2, in time domain, one subframe is divided into 14 symbols, i.e. symbols #0 to #13. In frequency domain, the RSS occupies 2 PRBs, which are equal to 24 subcarriers. Therefore, one resource element is one symbol in time domain and one subcarrier in frequency domain. Therefore, for RSS transmitted in a frequency range of 2 PRBs (24 subcarriers), each subframe is composed of 24*14 resource elements. The resource elements in each of symbols #0 to #2 across all of 2 PRBs are LTE control region. The resource elements in each of symbols #3 to #13 across all of 2 PRBs (11*24=264 resource elements in total) are RSS mapping region.

The mapping may be "frequency first and time second". That is, the sequence $d_i(n)$ maps to the resource elements in the RSS mapping region in the following manner: first in symbol #3, from lower frequency subcarrier to higher frequency subcarrier within the 24 subcarriers; then in the next symbol #4, from the lower frequency subcarrier to the higher frequency subcarrier within the 24 subcarriers; . . . until in the last symbol #13, from the lower frequency subcarrier to the higher frequency subcarrier within the 24 subcarriers.

As described above, the UE knows the frequency position of the RSS by the parameter freqLocation also included in NBIoT RSS configuration. When a non-anchor carrier is configured as one of the two PRBs in which RSS is transmitted, the non-anchor carrier may use the RSS transmitted in the one PRB as NSS.

According to a second embodiment, NSS is newly designed.

Figure 3:
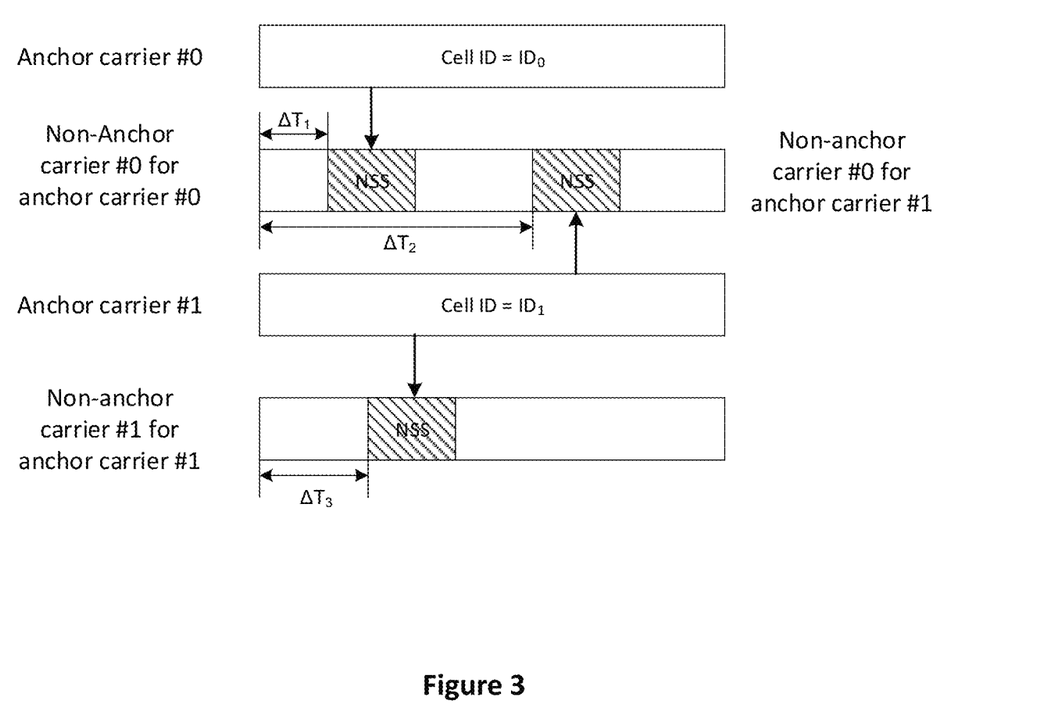
FIG. 3 is a schematic diagram illustrating relation between anchor carrier and non-anchor carrier.

First, the UE can be configured with one or more non-anchor carriers associated with anchor carrier. Each non-anchor carrier is associated with a non-anchor carrier index to the anchor carrier. The non-anchor carrier index may be implicitly derived from its frequency position or configured by RRC signaling. Preferably, the non-anchor carrier with a lower frequency has an index smaller than the non-anchor carrier with a higher frequency. For example, as shown in FIG. 3, anchor carrier #0 has one non-anchor carrier #0, while anchor carrier #1 has two non-anchor carriers #0 and #1. As can be seen from FIG. 3, non-anchor carrier #0 of anchor carrier #0 and non-anchor carrier #0 of anchor carrier #1 occupy the same frequency position.

The NSS for a non-anchor carrier is associated with a virtual ID. The virtual cell ID is configured by RRC signaling or determined at least by the cell ID of anchor carrier. For example, the virtual ID may be cell ID of anchor carrier (i.e. NBIoT cell ID) plus non-anchor carrier index multiplied by 504.

As non-anchor carriers of different anchor carriers (e.g. non-anchor carrier #0 of anchor carrier #0 and non-anchor carrier #0 of anchor carrier #1 shown in FIG. 3) may occupy the same frequency location, to avoid confliction between transmissions of NSSs of different non-anchor carriers, the NSSs associated with different anchor carriers are transmitted in a time divided multiplexing.

In particular, the timing offset within frame is configured by RRC signaling per anchor carrier per non-anchor carrier. That is, each non-anchor carrier is associated with a different timing offset to an absolute timing (e.g., to subframe 0 of absolute frame 0). The timing offset of NSS is included in the non-anchor carrier configuration.

As shown in FIG. 3, non-anchor carrier #0 for anchor carrier #0 has a timing offset $\Delta T_1$, non-anchor carrier #0 for anchor carrier #1 has a timing offset $\Delta T_2$, non-anchor carrier #1 for anchor carrier #1 has a timing offset $\Delta T_3$.

The timing offset determines the first subframe in which NSS is transmitted.

In time domain, NSS of a non-anchor carrier is transmitted in $N_1$ consecutive subframes of the non-anchor carrier starting from the first subframe determined by the timing offset, where the NSS duration $N_1$ is configured by higher layers. In frequency domain, the NSS is transmitted across the 12 subcarriers in one PRB for the non-anchor carrier.

The NSS sequence length L for each subframe is determined by the operation mode of the non-anchor carrier. In particular, for operation mode of inband, the sequence length is L=132 (12 subcarriers, in each subcarrier from symbol #3 to symbol #13, i.e. 12×11). For operation mode of guard-band or standalone, the sequence length is L=168 (12 subcarriers, in each subcarrier from symbol #0 to symbol #13, i.e. 12×14).

The sequence used for the i-th NSS subframe is generated according to Equation 2:

$$d_i(n) = \frac{1-2c(2n)}{\sqrt{2}} + jb(i)\frac{1-2c(2n+1)}{\sqrt{2}}, n = 0, 1, \ldots, L-1$$

Equation 2 is substantially the same as Equation 1, except that the length L for Equation 2 is determined by the operation mode of the non-anchor carrier. In Equation 2, c(n) is the pseudo-random sequence. The pseudo-random sequence generator may be initialized each subframe. The initialization seed $c_{init}$ is determined by at least one of virtual ID, cell ID of the anchor carrier, a system information change indicator and carrier index $n_{cc}$ or PRB index within the LTE system bandwidth $n_{PRB}$. For example, $c_{init}=N_{virtual}{}^{ID}+2^9 u+2^{10} n_{cc}$ or $c_{init}=N_{virtual}{}^{ID}+2^9 u+2^{10} n_{PRB}$.

The virtual ID of NSS can be the LTE cell ID, which is the cell ID of the anchor carrier. Alternatively, the virtual ID may be cell ID of anchor carrier (i.e. NBIoT cell ID) plus non-anchor carrier index multiplied by 504.

u is the system information change indicator, which is determined by the value of a higher layer parameter systemInfoValueTag configured in broadcast information. If new systemInfoValueTag is different from previous T duration of systemInfoValueTag, u is equal to 1 otherwise 0. T can be configured by RRC signaling or T is equal to SI validation time.

h(i) is given by the Table 1 as listed above.

In each subframe used for NSS transmission, the NSS sequence shall be mapped to resource elements starting with $d_i(0)$ in increasing order.

Figure 4:
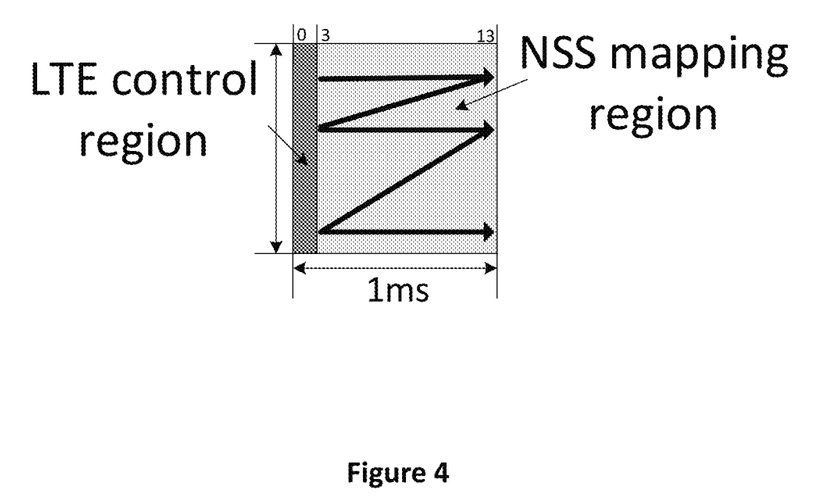
FIG. 4 is a schematic diagram illustrating mapping of NSS.

As shown in FIG. 4 (inband operation mode), each subframe is composed of 12*14 resource elements. In time domain, one subframe is divided into 14 symbols, i.e. symbols #0 to #13. In frequency domain, the NSS occupies 1 PRB, i.e. 12 subcarriers. The resource elements in each of symbols #0 to #2 across 12 subcarriers are LTE control region. The resource elements in each of symbols #3 to #13 across 12 subcarriers are NSS mapping region.

The mapping may be "time first and frequency second". That is, the sequence $d_i(n)$ maps to the resource elements first in a particular subcarrier (e.g. the lowest frequency subcarrier or the highest frequency subcarrier) from symbol #3 to symbol #13, then the next subcarrier (e.g. the second lowest frequency subcarrier or the second highest frequency subcarrier) from symbol #3 to symbol #13, . . . , until the last subcarrier (e.g. the highest frequency subcarrier or the lowest frequency subcarrier) from symbol #3 to symbol #13.

Figure 5A:
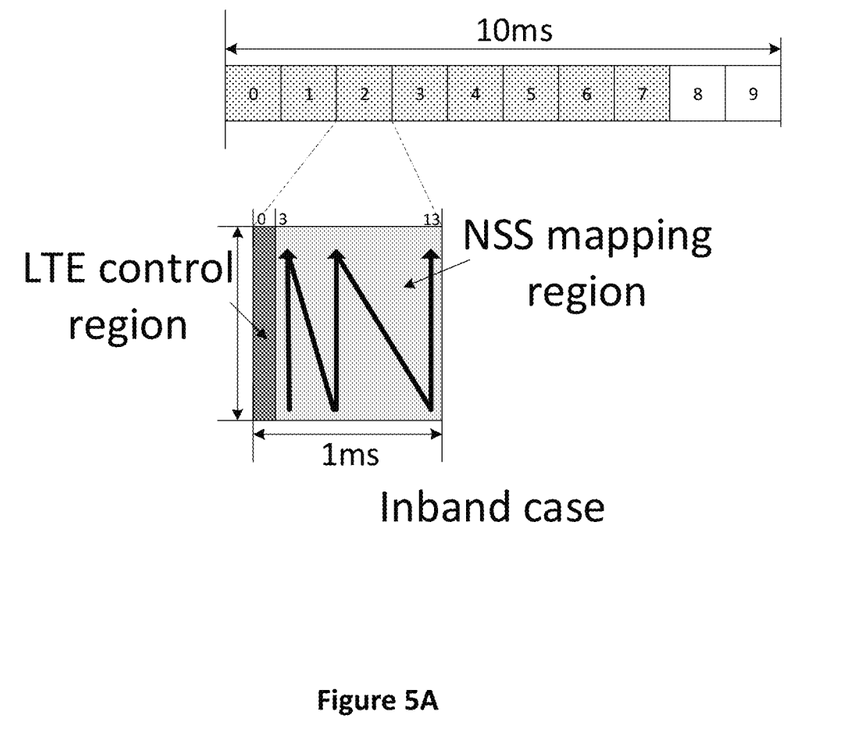
FIGS. 5A to 5C are schematic diagrams illustrating other examples of mapping of NSS.
Figure 5B:
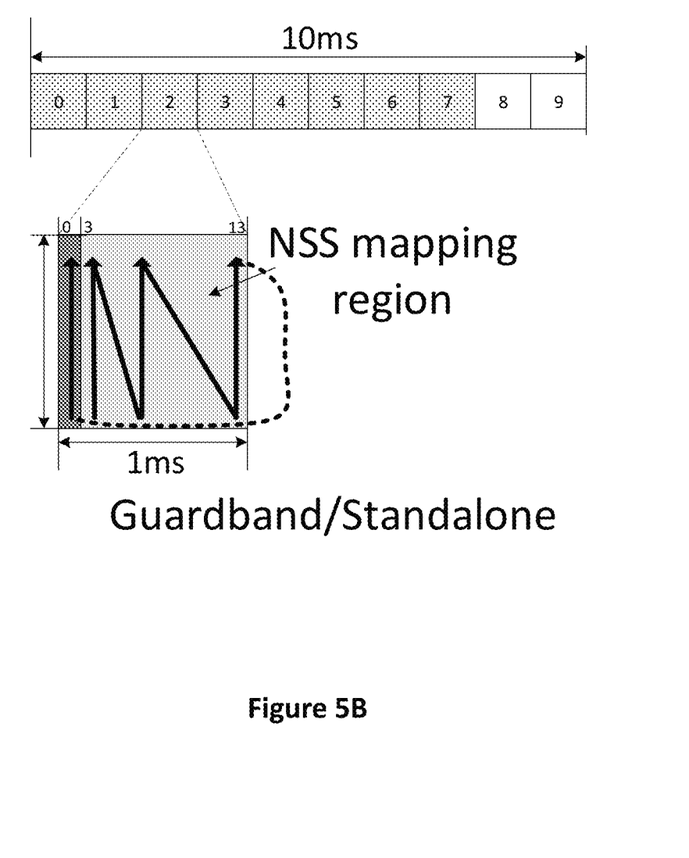
Figure 5C:
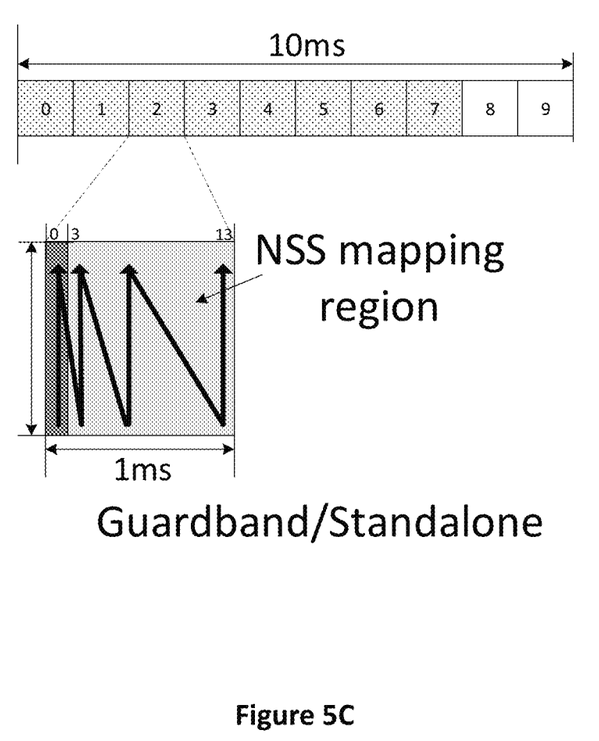

Alternatively, as shown in FIGS. 5A to 5C, the mapping may be "frequency first and time second". That is, the sequence $d_i(n)$ maps to the resource elements first in a symbol from the lower frequency subcarrier to the higher frequency subcarrier, then in a next symbol from the lower frequency subcarrier to the higher frequency subcarrier, . . . , until in the last symbol from the lower frequency subcarrier to the higher frequency subcarrier.

There are several implementations of "frequency first and time second" mapping determined by the operation mode.

As illustrated in FIG. 4A, in the operation mode of guardband or standalone, the resource elements in each of symbols #0 to #13 across 12 subcarriers may be NSS mapping region. The first symbol to be mapped is symbol #S, the second symbol to be mapped is symbol #S+1, . . . , until the symbol #13. Afterwards, NSS is mapped to symbol #0, symbol #1 until symbol #S. S may be fixed to 3 or configured by higher layer signaling.

FIG. 4B illustrates another implementation of "frequency first and time second" mapping in the operation mode of guardband or standalone, in which the resource elements in each of symbols #0 to #13 across 12 subcarriers may be NSS mapping region. In particular, the first symbol to be mapped is symbol #0, the second symbol to be mapped is symbol #2, . . . , until the last symbol #13.

FIG. 4C illustrates implementation of "frequency first and time second" mapping in the operation mode of inband, in which the resource elements in each of symbols #3 to #13 across 12 subcarriers may be NSS mapping region. The first symbol to be mapped is symbol #S, the second symbol to be mapped is symbol #S+1, . . . , until the last symbol #13. There is no mapping to symbols #0 to symbol #S, which are LTE control region. S may be fixed to 3 or configured by higher layer signaling.

According to a third embodiment, NSS is newly designed in another way.

The frequency position of the non-anchor carrier is obtained according to a carrier configuration transmitted on the anchor carrier.

NSS (Modified NB-PSS and optionally NB-SSS) can be transmitted in non-anchor carrier. To avoid confusion of PSS detection in anchor carrier, a modified NB-PSS sequence (different from NB-PSS in anchor carrier) is generated. If NB-SSS in non-anchor carrier is transmitted, it can use the same sequence as NB-SSS in anchor carrier.

The modified NB-PSS on non-anchor carrier sequence is generated from a frequency-domain Zadoff-Chu sequence (Equation 3):

$$d_i(n) = S_0(l) \cdot e^{-j\frac{\pi u n(n+1)}{11}}, n = 0, 1, \ldots, 10$$

In Equation 3, u is the root index of the Zadoff-Chu sequence. u may be a system information change indicator and be configured to a value ranging from 1-10 except 5. For example, u may be configured to 1 for system information changed, and be configured to 10 for system information unchanged. The system information changed or unchanged may be the same definition as that of the above-described second embodiment.

Alternatively, in Equation 3, $S_0(l)$ may be configured to $(-1)^{(l\%2)}*S(l)$ for system information changed, and be configured to $(-1)^{((l+1)\%2)}*S(l)$ for system information unchanged. Alternatively, $S_0(l)$ may be configured to $A(l)*S(l)$, where $A(l)$ is a quasi-orthogonal sequence, e.g. a cover code, shorten HADAMARD code. The system information change indicator is included in the cover code. $S(l)$ for different symbol indices l is given by Table 2:

TABLE 2

| Definition of S(l). | | | | | | | | | | | |
|---|---|---|---|---|---|---|---|---|---|---|---|
| Cyclic prefix length | S(3), . . . , S(13) | | | | | | | | | | |
| Normal | 1 | 1 | 1 | 1 | −1 | −1 | 1 | 1 | 1 | −1 | 1 |

Figure 6:
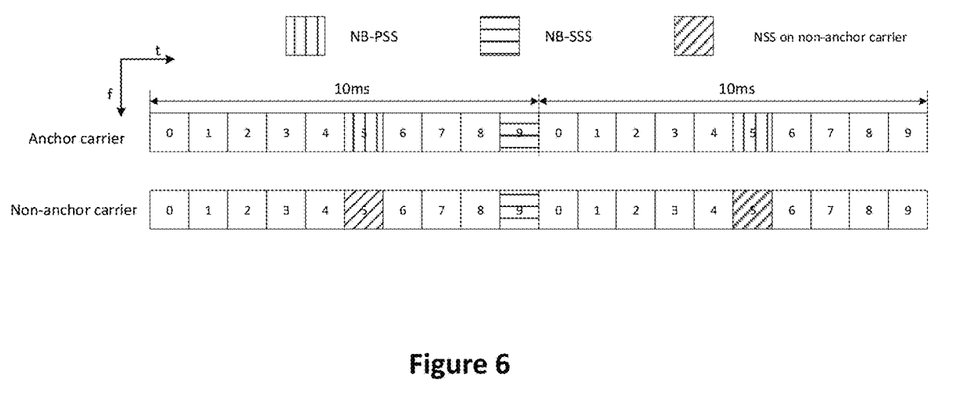
FIG. 6 is a schematic diagram illustrating another NSS design.

As illustrated in FIG. 6, the NSS on non-anchor carrier is transmitted in subframe #5 with a period of 10 ms, which is the same as NB-PSS transmitted in anchor carrier.

Optionally, a NB-SSS on non-anchor carrier may be transmitted in the same manner as NB-SSS transmitted on anchor carrier, e.g., with the same sequence as the sequence of NB-SSS on anchor carrier and being transmitted in subframe #9 with a period of 20 ms.

Figure 7:
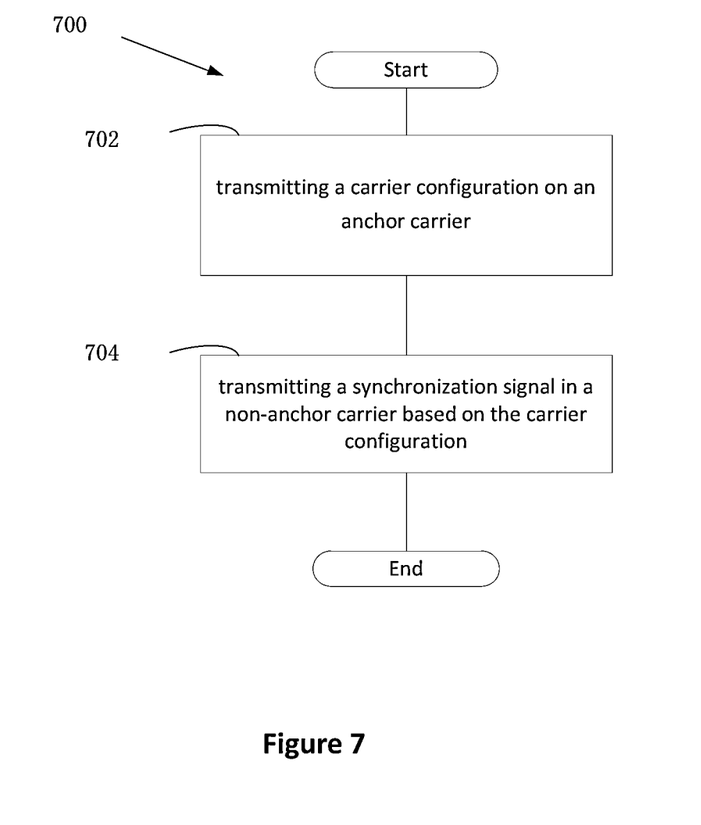
FIG. 7 is a schematic flow chart diagram illustrating an embodiment of a method.

FIG. 7 is a schematic flow chart diagram illustrating an embodiment of a method 700 according to the present application. In some embodiments, the method 700 is performed by an apparatus, such as a base unit. In certain embodiments, the method 700 may be performed by a processor executing program code, for example, a microcontroller, a microprocessor, a CPU, a GPU, an auxiliary processing unit, a FPGA, or the like.

The method 700 may include 702 transmitting a carrier configuration on an anchor carrier. The method 700 may further include 704 transmitting a synchronization signal in a non-anchor carrier based on the carrier configuration.

Figure 8:
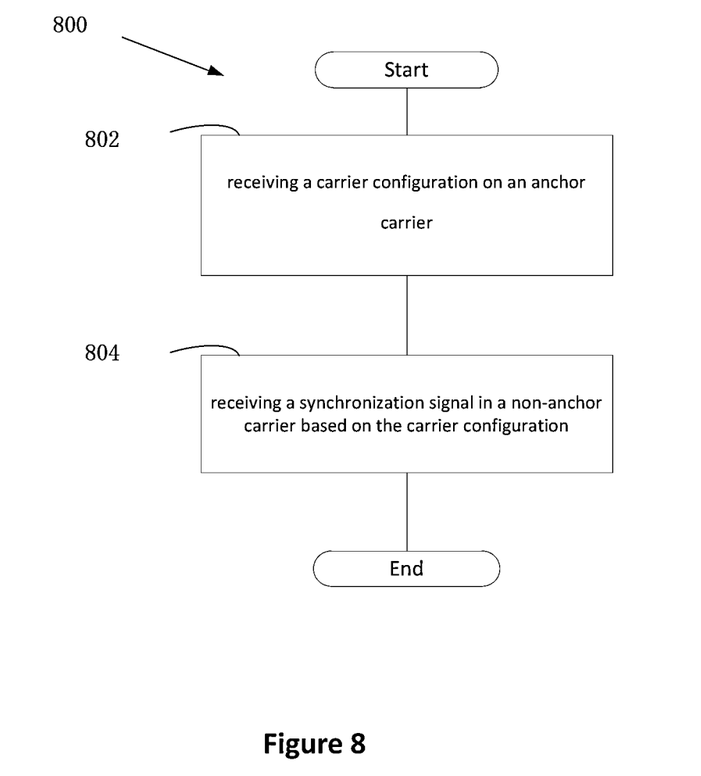
FIG. 8 is a schematic flow chart diagram illustrating a further embodiment of a method.

FIG. 8 is a schematic flow chart diagram illustrating a further embodiment of a method 800 according to the present application. In some embodiments, the method 800 is performed by an apparatus, such as a remote unit. In certain embodiments, the method 800 may be performed by a processor executing program code, for example, a microcontroller, a microprocessor, a CPU, a GPU, an auxiliary processing unit, a FPGA, or the like.

The method 800 may include 802 receiving a carrier configuration on an anchor carrier. The method 800 may further include 804 receiving a synchronization signal in a non-anchor carrier based on the carrier configuration.

Figure 9:
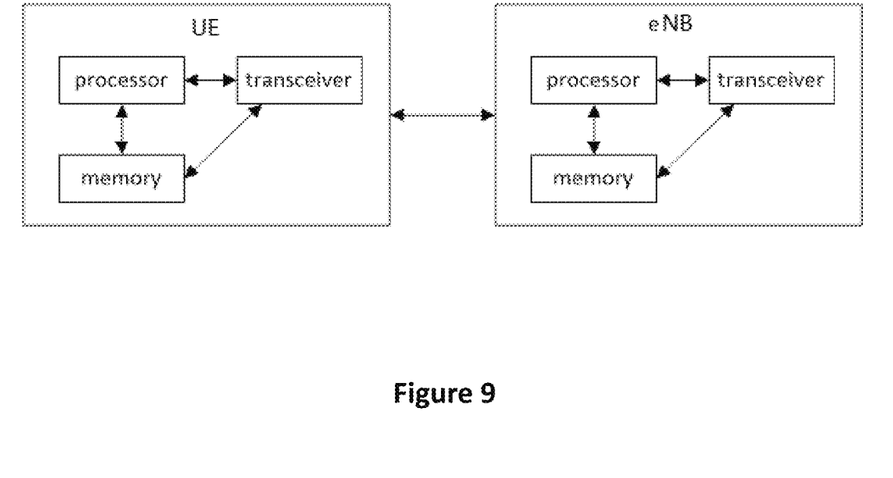
FIG. 9 is a schematic block diagram illustrating apparatuses according to one embodiment.

FIG. 9 is a schematic block diagram illustrating apparatuses according to one embodiment.

Referring to FIG. 9, the UE (i.e. the remote unit) includes a processor, a memory, and a transceiver. The processor implements a function, a process, and/or a method which are proposed in FIG. 8. The eNB (i.e. base unit) includes a processor, a memory, and a transceiver. The processors implement a function, a process, and/or a method which are proposed in FIG. 7. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the in foregoing description. All changes which come within the meaning and range of equivalency of the claims are to be embraced within their scope.

The invention claimed is:

1. A method performed by a base unit, comprising:
transmitting a first synchronization signal associated with a cell identifier (ID) and a first broadcast signal on an anchor carrier;
transmitting a non-anchor carrier configuration on the anchor carrier; and
transmitting a second synchronization signal associated with a virtual cell ID on a non-anchor carrier based on the non-anchor carrier configuration.

2. The method of claim 1, wherein the non-anchor carrier is associated with a carrier index, and the carrier index is included in the non-anchor carrier configuration or derived by a frequency position.

3. The method of claim 1, wherein the virtual cell ID is configured in the non-anchor carrier configuration or determined by the cell ID of the anchor carrier.

4. A base unit for wireless communication, comprising:
at least one memory; and
at least one processor coupled with the at least one memory and operable to cause the base unit to:
transmit a first synchronization signal associated with a cell identifier (ID) and a first broadcast signal on an anchor carrier;
transmit a non-anchor carrier configuration on the anchor carrier; and
transmit a second synchronization signal associated with a virtual cell ID on a non-anchor carrier based on the non-anchor carrier configuration.

5. The base unit of claim 4, wherein the non-anchor carrier is in an evolved-universal mobile telecommunications system terrestrial radio access (E-UTRA) system, and an ID offset of the virtual cell ID of the second synchronization signal to E-UTRA system cell ID is included in the non-anchor carrier configuration.

6. The base unit of claim 4, wherein the non-anchor carrier is in an evolved-universal mobile telecommunications system terrestrial radio access (E-UTRA) system, and an E-UTRA system cell ID is included in the non-anchor carrier configuration.

7. The base unit of claim 4, wherein the second synchronization signal is transmitted in a first number of time units.

8. The base unit of claim 7, wherein, in each time unit, the second synchronization signal is comprised of a random sequence with a length of L, the length of L is determined by an operation mode of the non-anchor carrier.

9. The base unit of claim 8, wherein an initialization seed of the random sequence is determined by at least one of a carrier index, the virtual cell ID, the cell ID of the anchor carrier, and a system information change indicator.

10. The base unit of claim 9, wherein the system information change indicator is determined by a higher layer parameter systemInfoValueTag of narrowband Internet-of-Things (NBIoT).

11. The base unit of claim 10, wherein the system information change indicator is equal to 1 when the systemInfoValueTag of the NBIoT in time unit synchronization signal transmission time unit is different from the systemInfoValueTag of the NBIoT of pervious T time units, and the T is configured in carrier configuration or equal to system information (SI) validation time.

12. The base unit of claim 7, wherein the second synchronization signal is mapped to time-frequency resources of each time unit based on an operation mode of the non-anchor carrier.

13. The base unit of claim 12, wherein the mapping of the second synchronization signal comprises one of:
   symbol S to a last symbol of a time unit and then symbol 0 to symbol S−1,
   symbol S to the last symbol of the time unit, and
   symbol 0 to the last symbol of the time unit, wherein S is determined by higher layer or fixed to 3.

14. The base unit of claim 7, wherein, in each time unit, the second synchronization signal is comprised of a Zadoff-chu sequence, and a system information change indicator is included in generation of the Zadoff-chu sequence.

15. The base unit of claim 14, wherein the system information change indicator is included in a root index of the Zadoff-chu sequence of the second synchronization signal.

16. The base unit of claim 14, wherein the second synchronization signal is further comprised of a cover code, and the system information change indicator is included in the cover code.

17. A remote unit for wireless communication, comprising:
   at least one memory; and
   at least one processor coupled with the at least one memory and operable to cause the remote unit to:
   receive a first synchronization signal associated with a cell identifier (ID) and a first broadcast signal on an anchor carrier:
   receive a non-anchor carrier configuration on the anchor carrier;
   and receive a second synchronization signal associated with a virtual cell ID on a non-anchor carrier based on the non-anchor carrier configuration.

18. The remote unit of claim 17, wherein the non-anchor carrier is associated with a carrier index, and the carrier index is included in the non-anchor carrier configuration or derived by a frequency position.

19. The remote unit of claim 17, wherein the virtual cell ID is configured in the non-anchor carrier configuration or determined by the cell ID of the anchor carrier.

20. A method performed by a remote unit, comprising:
   receiving a first synchronization signal associated with a cell identifier (ID) and a first broadcast signal on an anchor carrier;
   receiving a non-anchor carrier configuration on the anchor carrier;
   and receiving a second synchronization signal associated with a virtual cell ID on a non-anchor carrier based on the non-anchor carrier configuration.

* * * * *